United States Patent
Oba

(10) Patent No.: US 7,580,139 B2
(45) Date of Patent: Aug. 25, 2009

(54) INFORMATION PROCESSING APPARATUS, INFORMATION PROCESSING METHOD, PRINTING SYSTEM, JOB PROCESSING METHOD, STORAGE MEDIUM, AND PROGRAM FOR PRINTING DATA INPUT TO A FOLDER

(75) Inventor: Yoshitaka Oba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 11/199,989

(22) Filed: Aug. 10, 2005

(65) Prior Publication Data
US 2006/0033952 A1    Feb. 16, 2006

(30) Foreign Application Priority Data
Aug. 12, 2004   (JP)   ............... 2004-235554

(51) Int. Cl.
G06F 3/12        (2006.01)
G06F 17/00       (2006.01)
(52) U.S. Cl. .................... 358/1.1; 715/251; 715/276
(58) Field of Classification Search .................. 358/1.2, 358/1.6, 1.9, 1.12, 1.14, 1.15, 296, 347, 1.1; 707/1, 517; 715/517, 530, 764, 251, 276; 399/385
See application file for complete search history.

(56) References Cited

U.S. PATENT DOCUMENTS

2003/0086719 A1* 5/2003 Dennison et al. .............. 399/81
2003/0161670 A1* 8/2003 Watanabe et al. ............. 400/61
2005/0162667 A1* 7/2005 Felix et al. .................... 358/1.1
2005/0246631 A1* 11/2005 Mori et al. .................. 715/515

FOREIGN PATENT DOCUMENTS

| JP | 10-016343 | 1/1998 |
| JP | 2000-118095 | 4/2000 |
| JP | 2003-76525 | 3/2003 |
| JP | 2003263303 A | 9/2003 |
| JP | 2003280843 A | 10/2003 |

OTHER PUBLICATIONS

InfoPrint Manager Hot Folders, dated Oct. 24, 2001, retrieved from <ftp://ftp.software.ibm.com/printers/specs/hf_submit.pdf>, accessed Jan. 27, 2009.*

(Continued)

Primary Examiner—Kimberly A Williams
(74) Attorney, Agent, or Firm—Fitzpatrick, Cella, Harper & Scinto

(57) ABSTRACT

A print configuration is set to a folder in accordance with a user instruction. When an operation of inputting a file into the folder is detected, the file is managed. A determination is made as to whether each of a plurality of managed files has a predetermined type and is inputted into the folder in a predetermined order defined by the predetermined type. In a case where it is determined that each of the managed files has the predetermined type and is inputted into the folder in the predetermined order, the managed files are merged in the predetermined order to generate print data to be outputted to a print device for printing according to the print configuration. The generated print data is transmitted to the print device.

8 Claims, 14 Drawing Sheets

OTHER PUBLICATIONS

Helios Image Server Manual Version 2.5, dated Nov. 11, 2002, retrieved from <http://www.helios.de/support/manuals/manuals.phtml>, accessed Jan. 27, 2009.*

Hot Folder Printer 1.2, dated Jun. 10, 2005, retrieved from <http://download.nytimes.com/Hot-Folder-Printer/9103-2088_4-10397049.html?tag=foot_ur>, accessed Jan. 28, 2009.*

Japanese Office Action dated Apr. 13, 2009 in corresponding Japanese Application No. 2004-235554.

Japanese Office Action dated Jan. 6, 2009 in corresponding Japanese Application No. 2004-235554.

* cited by examiner

INFORMATION PROCESSING APPARATUS, INFORMATION PROCESSING METHOD, PRINTING SYSTEM, JOB PROCESSING METHOD, STORAGE MEDIUM, AND PROGRAM FOR PRINTING DATA INPUT TO A FOLDER

FIELD OF THE INVENTION

The present invention relates to a technique of processing a file to be printed.

BACKGROUND OF THE INVENTION

Conventional multi-functional printers having multiple functions such as printing, copying, FAX, and scanning are classified into ones which incorporate a raster image processor (RIP) and ones which are externally connected to the RIP.

Internal and external RIPs have different merits. Merits of the internal RIP are low total cost and a narrow device installation space. A merit of the external RIP is that the RIP performance can be flexibly enhanced because the degree of freedom of hardware is high.

Recently, the communication speed between devices abruptly increases. From a comparison in each function between entire systems, a multi-functional printer with an external RIP has come to provide services at the same level as those provided by a printer with an internal RIP.

As the process speed increases, a printer can perform not only printing from an application, but also printing containing various output processes (finishing), and can achieve a complicated job process.

As a method of transmitting a job to a printer, there are proposed download tool printing, LPR (Line PRinter daemon protocol) printing, ftp (File Transfer Protocol) printing using ftp communication, and E-main printing of printing an attached file by using sending/reception of E-mail.

There is also being proposed a method of, when the operator of a client computer performs operation to store a file to be printed into a folder displayed on the display screen of the client computer in transmitting print data from the client computer to a printing apparatus, adding the attribute of an output process to the stored file, converting the file into proper print data, and then transmitting the print data to the printing apparatus (see, e.g., Japanese Patent Laid-Open No. 2003-076525).

However, the folder proposed at present supports only simple tasks such as addition of color process setting data, stapling, and punching, and does not support more advanced work such as merging of jobs desired by the user, and an insertion/merging function.

SUMMARY OF THE INVENTION

The present invention has been made to overcome the conventional drawbacks, and has as its object to provide a technique of expanding a conventional process to a file to be printed that is stored in a folder.

In order to achieve an object of the present invention, for example, an information processing apparatus of the present invention comprises the following arrangement.

That is, an information processing apparatus capable of communicating data with a printing apparatus, comprising:

generation unit adapted to, when at least two files input to a folder for inputting a file to be printed by the printing apparatus satisfy a predetermined condition, generate one file by merging the at least two files; and output unit adapted to generate print data on the basis of the one file generated by the generation unit, and outputting the generated print data to the printing apparatus.

In order to achieve an object of the present invention, for example, an information processing apparatus of the present invention comprises the following arrangement.

That is, an information processing apparatus capable of communicating data with a printing apparatus, comprising:

generation unit adapted to, when at least two files input to a folder for inputting a file to be printed by the printing apparatus satisfy a predetermined condition, generate one file by inserting, into a file of interest, a file other than the file of interest; and output unit adapted to generate print data on the basis of the one file generated by the generation unit, and outputting the generated print data to the printing apparatus.

In order to achieve an object of the present invention, for example, an information processing method of the present invention comprises the following arrangement.

That is, an information processing method capable of communicating data with a printing apparatus, comprising:

a generation step of, when at least two files input to a folder for inputting a file to be printed by the printing apparatus satisfy a predetermined condition, generating one file by merging the at least two files; and an output step of generating print data on the basis of the one file generated in the generation step, and outputting the generated print data to the printing apparatus.

In order to achieve an object of the present invention, for example, an information processing method of the present invention comprises the following arrangement.

That is, an information processing method capable, of communicating data with a printing apparatus, comprising:

a generation step of, when at least two files input to a folder for inputting a file to be printed by the printing apparatus satisfy a predetermined condition, generating one file by inserting, into a file of interest, a file other than the file of interest; and an output step of generating print data on the basis of the one file generated in the generation step, and outputting the generated print data to the printing apparatus.

In order to achieve an object of the present invention, for example, a printing system of the present invention comprises the following arrangement.

That is, a printing system comprising:

a printing apparatus adapted to perform a printing of data of a plurality of independent data including first data and second data; and a controller adapted to cause the printing apparatus to execute a printing process of the first data, without waiting for input of the second data to a first folder, in case that the first data is input to the first folder of a plurality of folders including the first folder and a second folder, wherein the controller causes the printing apparatus to perform a printing process of a merged data where the first data and the second data are included, without starting the printing process of the first data, in case that the first data is input to the second folder of the plurality of folders.

In order to achieve an object of the present invention, for example, a job processing method of the present invention comprises the following arrangement.

That is, a job processing method of a printing system includes a printing apparatus which can perform a printing of data of a plurality of independent data including first data and second data, the steps comprising:

allowing a printing process of the first data by the printing apparatus, without waiting for input of the second data to a first folder, in case that the first data is input to the first folder of a plurality of folders including the first folder and a second folder; and causing the printing apparatus to perform a printing process of a merged data where the first data and the second data are included, without starting the printing process of the first data, in case that the first data is input to the second folder of the plurality of folders.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

The first embodiment will describe a case wherein one computer and one printing apparatus are connected to each other so that they can communicate data with each other, and print data is transmitted from the computer to the printing apparatus.

<System Configuration>

Figure 1:
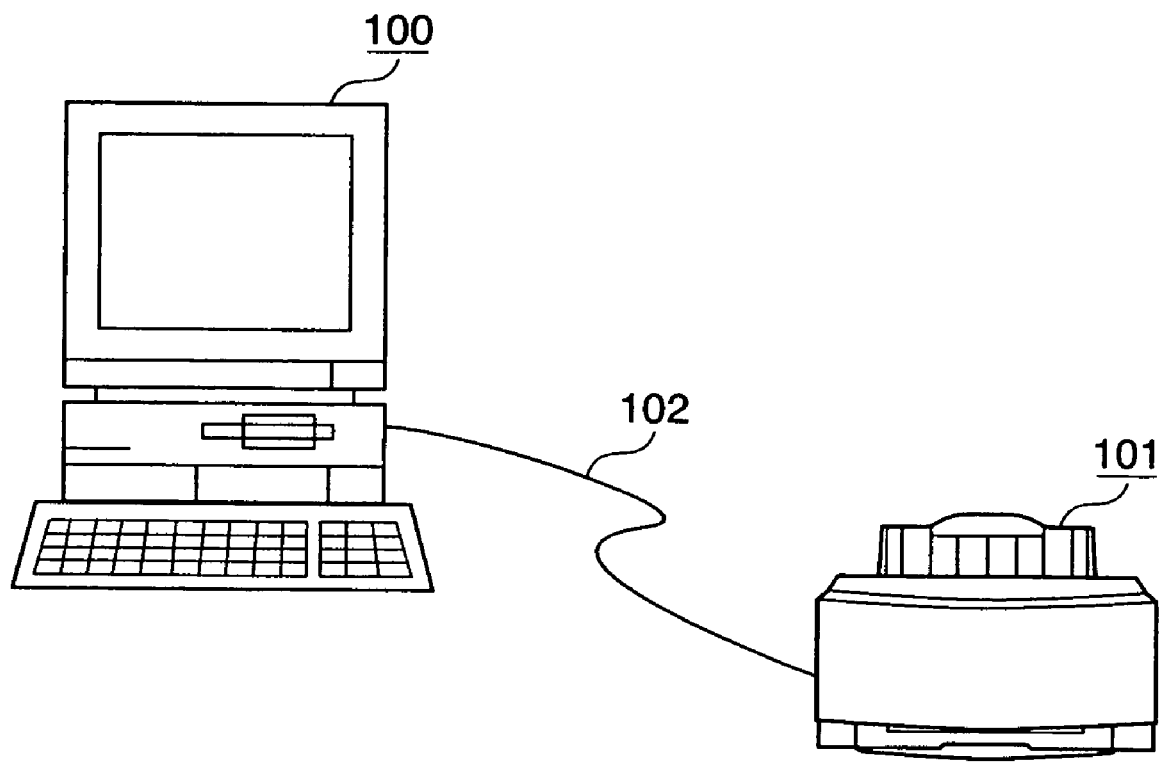
FIG. 1 is a view showing the configuration of a system according to the first embodiment of the present invention.

FIG. 1 is a view showing the configuration of a system according to the first embodiment. As shown in FIG. 1, the printing system according to the first embodiment comprises at least one computer 100 and one printing apparatus 101. The computer 100 and printing apparatus 101 can communicate data with each other via a network line 102. Note that data communication may be done by radio. In this case, reference numeral 102 denotes a radio channel.

The printing apparatus 101 may take a form of a multi-functional image forming apparatus which has a scanner unit and printer unit and comprises a plurality of functions (e.g., a network scanner function, a copying function capable of printing print data from the scanner unit of the printing apparatus 101 by its printer unit via a memory such as the hard disk of the apparatus, and a printing function capable of printing print data output from an external apparatus such as the computer 100 by the printer unit of the printing apparatus 101 via its memory). Alternatively, the printing apparatus 101 may take a form of a single-functional image forming apparatus having only the printing function among these functions.

Figure 2:
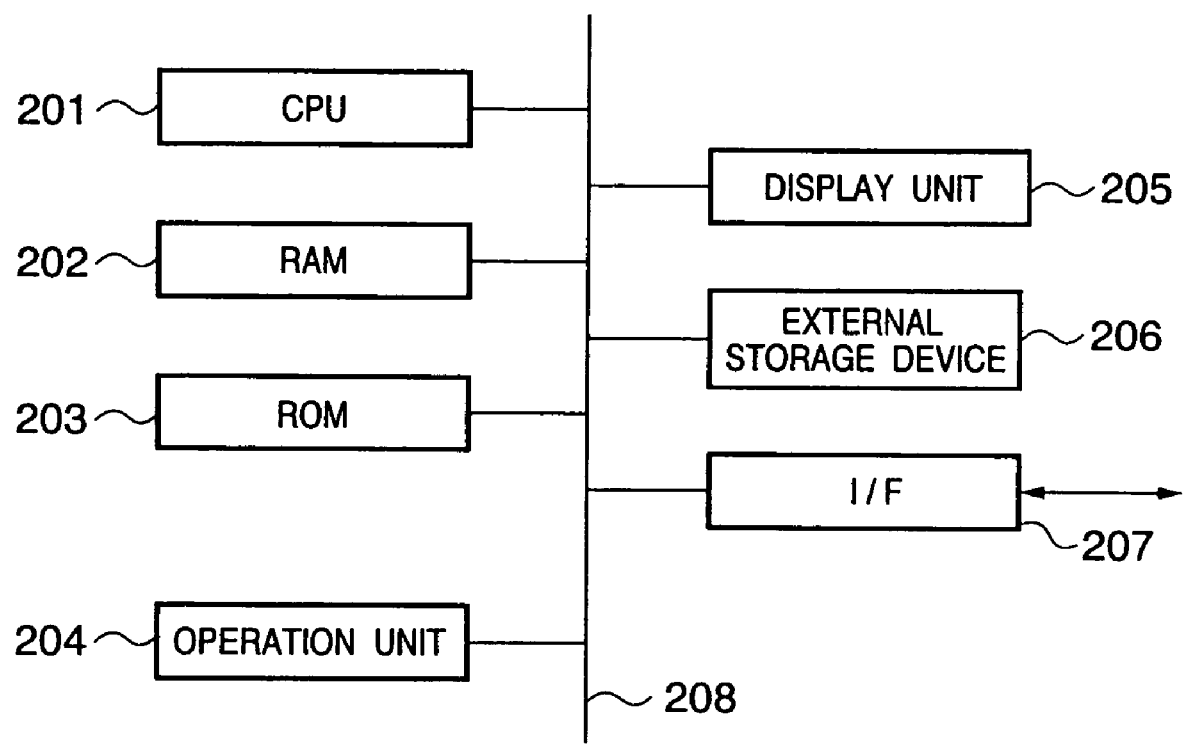
FIG. 2 is a block diagram showing the basic configuration of a computer 100.

FIG. 2 is a block diagram showing the basic configuration of the computer 100 as an example of the information processing apparatus. The computer 100 is comprised of, e.g., a general PC (Personal Computer) and WS (Work Station).

Reference numeral 201 denotes a CPU which controls units of the computer 100 to control the whole computer 100, and executes processes (to be described later) to be performed by the computer 100.

Reference numeral 202 denotes a RAM which has an area for temporarily storing programs and data loaded from an external storage device 206, and a work area used to perform various processes by the CPU 201.

Reference numeral 203 denotes a ROM which stores set data and a boot program of the computer 100.

Reference numeral 204 denotes an operation unit which is made up of a keyboard and mouse, and allows the operator of the computer 100 to operate the operation unit 204 and input various instructions to the CPU 201.

Reference numeral 205 denotes a display unit which is formed from a CRT, liquid crystal screen, or the like, and can display a process result by the CPU 201 with images and texts.

In response to user operation, the CPU 201 controls the display unit 205 so as to display various user interface windows such as a printer driver window for setting various print conditions for the printing apparatus 101, and a print instruction window using a hot folder (to be described later). The CPU 201 can control the computer 100 or printing apparatus 101 to execute a process corresponding to an instruction from the operator via the user interface window.

The external storage device 206 is a large-capacity information storage device which is typified by a hard disk drive. The external storage device 206 saves programs and data for causing an OS (Operating System) or the CPU 201 to execute processes (to be described later) to be performed by the computer 100, programs and data of application software for creating a file to be printed (to be also referred to as document data, image data, print data, or job data), and a created file to be printed. These program data which can be read out and executed by the CPU 201 of the computer 100 may be stored in the storage device 206 by externally downloading the program data from, e.g., a server computer or a Web site on the Internet, or inserting a removable medium such as a CD-ROM into the computer 100, installing the program data from the medium, and executing the program.

Reference numeral 207 denotes an I/F which functions as an interface for data communication with the printing apparatus 101. When the network 102 is a wired network, a network line for the wired network is connected to the I/F 207, and the computer 100 can communicate data with the printing apparatus 101 via the I/F 207.

Reference numeral 208 denotes a bus which connects the above-described units.

Figure 3:
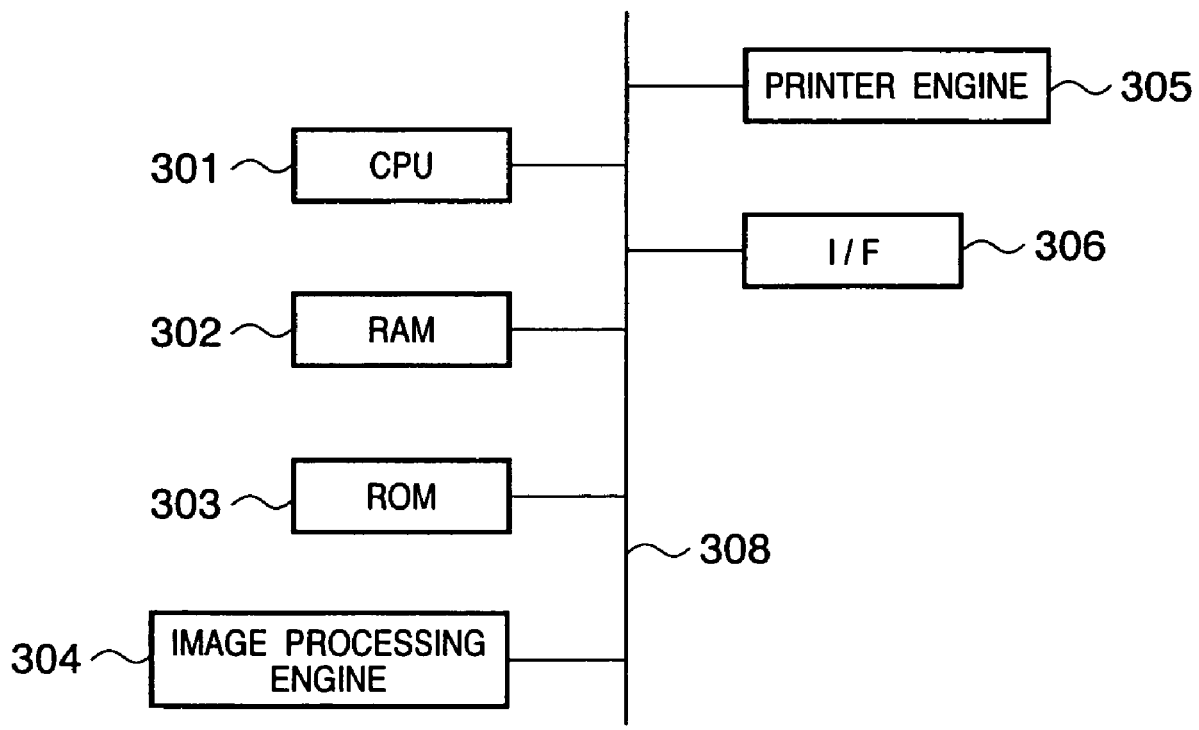
FIG. 3 is a block diagram showing the basic configuration of a printing apparatus 101.

FIG. 3 is a block diagram showing the basic configuration of the printing apparatus 101. The printing apparatus 101 will be described as a single-functional printing apparatus having only the printer function, but may be a multi-functional apparatus which has a plurality of functions by adding the FAX and scanning functions.

Reference numeral 301 denotes a CPU which controls various units of the printing apparatus 101 to control the whole printing apparatus 101, and executes processes (to be described later) to be performed by the printing apparatus 101.

Reference numeral 302 denotes a RAM which has an area for temporarily storing print data received from the computer 100 via an I/F 306 (to be described later), and an area for temporarily storing data (e.g., image data which has been mapped from PDL data into bitmap data) converted interpretably by a printer engine 305 (to be described later) on the basis of the print data. The RAM 302 also has a work area used when the CPU 301 and an image processing engine 304 perform various processes. The printing apparatus 101 may have a large-capacity image memory (e.g., a hard disk) to store a plurality of job data.

Reference numeral 303 denotes a ROM which stores set data and a boot program of the printing apparatus 101, and programs and data for causing the CPU 301 and image processing engine 304 to execute basic operation of the printing apparatus 101.

The image processing engine 304 performs a known data conversion process associated with printing to map print data received from the computer 100 via the I/F 306 into data interpretable by the printer engine 305.

The printer engine 305 performs a process of forming an image on a printing medium (e.g., paper or OHP) on the basis of data obtained from the image processing engine 304.

The I/F 306 functions as an interface for data communication with the computer 100. When the network 102 is a wired network, a network line for the wired network is connected to the I/F 306, and the printing apparatus 101 can communicate data with the computer 100 via the I/F 306.

Reference numeral 308 denotes a bus which connects the above-described units.

<Hot Folder>

The first embodiment provides a configuration which, when the operator of the computer 100 wants to print a desired file by the printing apparatus 101, allows the operator to perform operation of inputting (storing) the file to a folder displayed on the display screen of the computer 100 (operation of dragging a document icon displayed on the screen of the display unit 205 and dropping the document icon into a folder on the screen by user's mouse operation of the operation unit 204). In response to drop (input) of document data into the folder, the CPU 201 transmits the document data from the computer 100 to the printing apparatus together with print condition data representing print conditions (number of printouts, paper size, stapling instruction, and the like) set in advance for the folder. The printing apparatus 101 is caused to print the document data in accordance with the print conditions set for the folder. In the first embodiment, the folder is so configured as to be able to store a plurality of files to be printed (a plurality of document data). When stored files satisfy a predetermined condition, the files to be printed that are stored in the folder are merged into one file to be printed. The merged file (merged data) to be printed is transmitted to the printing apparatus 101, causing the printing apparatus 101 to print the merged data.

In the following description, a folder for inputting a file to be printed by the printing apparatus 101 will be called a "hot folder".

In other words, the hot folder function can cause the printing apparatus 101 to print input data under process conditions set for the hot folder in response to input of the data to be printed to the hot folder displayed on the display unit. Also, the hot folder function can cause the printing apparatus 101 to print by dragging and dropping a file to be printed on the screen into the hot folder on the screen without prompting the user to execute a series of operations of, e.g., opening the file on the display unit 205 of the computer 100, activating a printer driver, displaying the printer driver window, and prompting the user to issue a print instruction to the printing apparatus 101 via the printer driver window (without opening the file in the computer 100 by double clicking or the like).

By adopting this function in the first embodiment, user operation for executing a printing process desired by the user with the printing apparatus 101 can be minimized to improve user friendliness and convenience.

The following example is directed to a system form in which the hot folder is not shared on a network and the entity of the hot folder exists in the computer 100, but the following system may be used. For example, the printing system comprises a plurality of computers having the same functions as those of the computer 100, and these computers are networked. A hot folder managed in an administrative apparatus such as a server on the network can be browsed and operated by the respective computers. Each computer inputs a file to be printed (file may be data saved in the memory of the computer or the data itself may be data on the network) to the hot folder which is shared on the network and displayed on the screen of the computer, and thereby transmits the data to the printing apparatus 101 via the server apparatus. As a result, the computer can cause the printing apparatus 101 to print the data under print conditions set in advance for the hot folder shared on the network. The first embodiment may be applied to this system configuration in which the entity of the hot folder exists not in the apparatus (computer 100) but in the network. The first embodiment includes any other system form.

Figure 4:
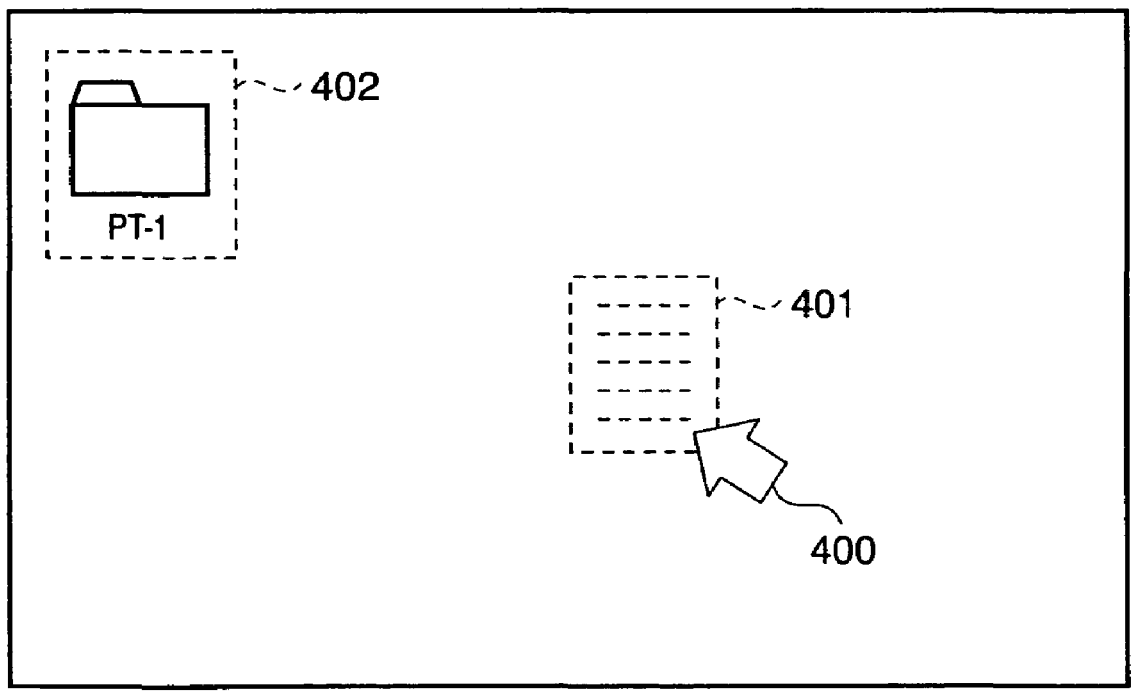
FIG. 4 is a view showing a display example of a display unit 205 when the operator of the computer 100 operates an operation unit 204 to store a file to be printed in a folder.

FIG. 4 is a view showing an example of an operation window for the hot folder that is displayed by the CPU 201 on the display unit 205 of the computer 100 when the operator of the computer 100 operates the operation unit 204 (mainly the mouse) to store a file to be printed in the hot folder.

In FIG. 4, reference numeral 400 denotes a mouse cursor (pointer) whose position can be moved on the screen under the control of the CPU 201 in response to mouse operation of the operation unit 204 by the user. The user moves the display position of the mouse cursor 400 to the display position of a file (strictly speaking, this file is an icon of data to be printed) displayed on the screen (the pointer is adjusted to the document icon), and clicks the mouse button at this position. In response to this, the CPU 201 controls the display unit 205 so as to display the file icon in gray. In this state, the file is selected by the user. Then, the user moves the mouse cursor 400 while keeping pressing the mouse button (moving the mouse cursor 400 while catching the file icon with the pointer). In response to this, the CPU 201 controls the display unit 205 so as to change the display position of the file icon displayed in gray following the movement of the mouse cursor 400. In FIG. 4, a file represented by an icon 401 is selected.

Reference numeral 402 denotes a hot folder described above (strictly speaking, the hot folder is a hot folder icon). By the above icon operation with the mouse cursor 400, the user moves the icon 401 of a file to be printed close to the display position of the folder icon 402, and releases the press of the mouse button at this position (drops the document icon 401 into the hot folder icon 402). Then, the CPU 201 controls to input the file to the folder 402. Note that operation of storing a file into a folder is a known technique, and a further description thereof will be omitted.

In this manner, when a file to be printed is input to the hot folder, the CPU 201 controls to store the file, which has been input to the folder, into a predetermined area (area for storing data dropped into the hot folder 402) in the RAM 202.

Figure 8:
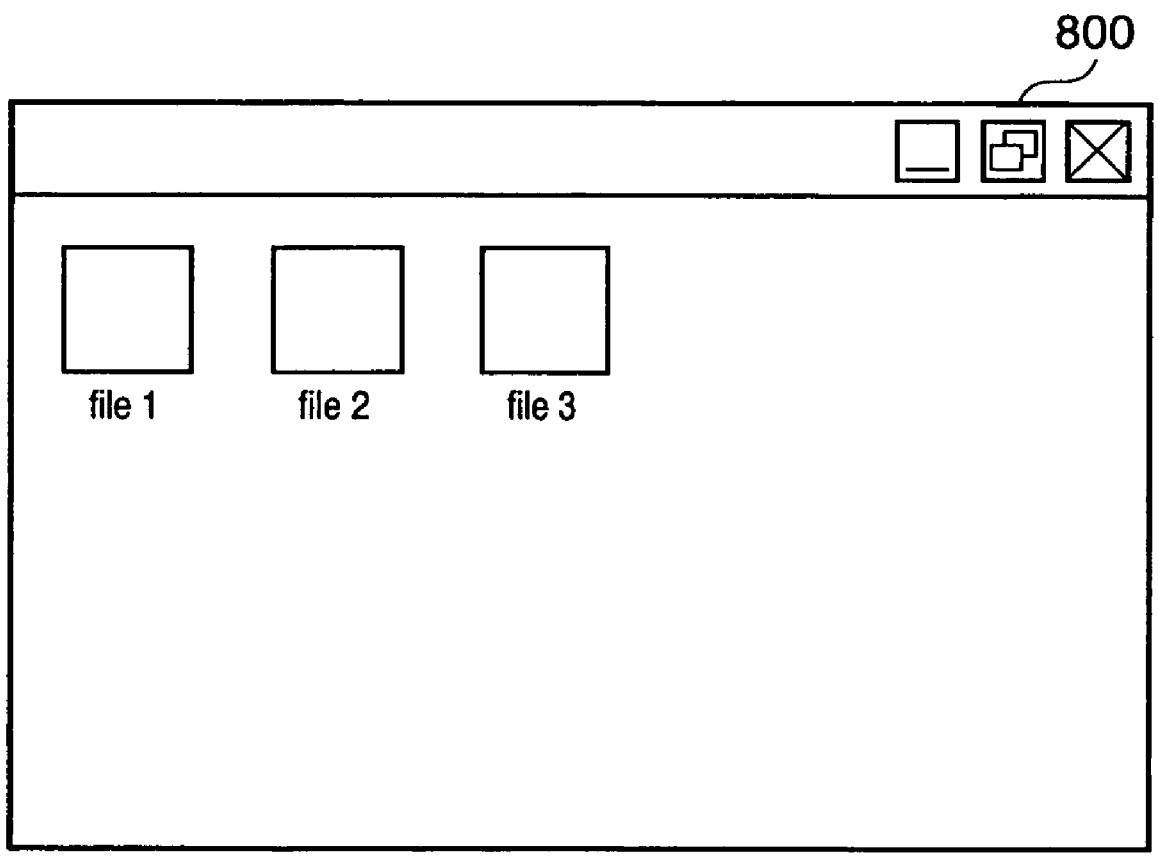
FIG. 8 is a view showing a display example of a window for displaying files held in a hot folder 402.

FIG. 8 is a view showing a display example of a window for displaying files held in the hot folder 402. The window in FIG. 8 is displayed on the display screen of the display unit 205 by, for example, double-clicking the mouse button near the display position of the folder 402. In FIG. 8, a series of data having a file name "file 1", a series of data having a file name "file 2", and a series of data having a file name "file 3" are files to be printed which are input to the hot folder as data to be merged.

The window in FIG. 8 is displayed when the user wants to confirm document to be merged that are stored in the folder. The system is configured to generate data by merging a plurality of documents input to the hot folder, and cause the printing apparatus 101 to print the merged data without displaying the window in FIG. 8 on the display unit 205 when a document merging condition is satisfied.

In the first embodiment, when a file to be printed is input to the hot folder, the CPU 201 counts the number of input files. If the number of input files reaches a predetermined number, the CPU 201 merges the input files to be printed in the input order, thereby reconstructing one file. The CPU 201 converts the reconstructed file into print data by the printer driver of the printing apparatus 101 (without executing operation of, e.g., opening the file, activating the printer driver window, and executing a print instruction), and transmits the print data to the printing apparatus.

As described above, the first embodiment controls to, when a predetermined merging condition is satisfied, merge a plurality of independent data input to the hot folder by user's ion operation and cause the printing apparatus 101 to print the merged data. A work instruction to execute a series of processes/control operations can be registered as an initial setting in advance in the hot folder by the user or administrator. After the initial setting is made for the hot folder, the series of processes can be executed under the control of the CPU 201.

On the assumption of this configuration, according to the first embodiment, a plurality of hot folders may be prepared (these hot folders are so configured as to be accessed by only the computer 100 or to be shared on a network and accessed by any of computers including the computer 100).

The user or administrator sets in advance, in at least one hot folder (to be referred to as, e.g., the first type hot folder) among the hot folders, command data representing a series of process condition instructions such as "to make printing wait until two independent document data to be merged are entirely input, after the two document data to be merged are entirely input, merge the data, transmit the merged data to the printing apparatus 101, print the merged data as data of one group by two copies page by page on A4-size print sheets, and staple a bundle of printed sheets as a bundle of one group".

Further, the user or administrator sets in advance, in a hot folder (to be referred to as the second type hot folder) other than the first type hot folder, command data representing a process condition instruction such as "when one document data is input, transmit the document data to the printing apparatus 101, print the document data by five copies page by page on A3-size print sheets, and execute a sort process of the printed sheets".

Upon the completion of the above-mentioned initial setting for each hot folder, for example, a list of the icons of the hot folders is displayed on the screen of the computer 100 under the control of the CPU 201. In addition, a list of the icons of independent document data including, e.g., the icon of the first document data formed from a 3-page document and the icon of the second document data formed from a 2-page document is also displayed on the screen.

For example, the icon of the first document data is dragged on the screen by user's mouse operation of the operation unit 204 and dropped (input) into the second type hot folder. In response to this, the CPU 201 controls to directly transmit the first document data to the printing apparatus 101 without opening the file on the screen. The CPU 201 also controls the printing apparatus to print the first document data under process conditions registered for the second type hot folder. In this example, the first document data of three pages is printed out page by page on A3-size print sheets, this process is repeated by five output copies, and the printed sheets are sorted by the finisher of the printing apparatus 101.

To the contrary, for example, when the icon of the first document data is dragged and dropped (input) into the first type hot folder on the screen by user's mouse operation of the operation unit 204, the CPU 201 does not transmit the first document data to the printing apparatus 101 at this time, and inhibits the printing apparatus 101 from printing the data. The CPU 201 makes the printing apparatus 101 wait until another document data to be merged to the first document data is input to the first type hot folder.

In this state, for example, the icon of the second document data is dragged and dropped (input) into the first type hot folder on the screen by user's mouse operation of the operation unit 204. In response to this, the CPU 201 creates, in the memory (e.g., the storage device 206 or RAM 202), merged document data of a total of five pages by merging 3-page document data (e.g., page images A1, A2, and A3) contained in the first document data and 2-page document data (e.g., B1 and B2) contained in the second document data in the same order as the order of inputting these document data to be merged into the first type hot folder (order of user's operation of dropping the icons of the documents to be merged into the hot folder icon) (in this case, merged document data in a page order of A1, A2, A3, B1, and B2 is created). The CPU 201 controls to transmit the merged document data to the printing apparatus 101. The CPU 201 controls the printing apparatus 101 to print the merged data under process conditions registered for the first type hot folder. In this example, the document data of five pages merged in a page order of A1, A2, A3, B1, and B2 is printed out page by page on A4-size print sheets, two output copies of the document data are created, and the printed sheets are stapled by the finisher of the printing apparatus 101.

Also in this process sequence, similar to the above sequence, the CPU 201 controls to execute the print sequence using the hot folder without causing the user to execute a series of operations of, e.g., opening the files of the first and second document data on the screen of the computer 100, activating the printer driver, and setting print conditions.

In the above way, the control unit such as the CPU 201 controls the printing system according to the first embodiment. More specifically, when the first data is input to the first folder (corresponding to the second type hot folder in the above control example) among a plurality of folders including the first folder (corresponding to the second type hot folder in the above control example) and the second folder (corresponding to the first type hot folder in the above control example), the control unit allows the printing apparatus 101 to print the first data without waiting for input of the second data to the first folder (corresponding to the second type hot folder in the above control example). When the first data is input to the second folder (corresponding to the first type hot folder in the above control example) among the plurality of folders, the control unit inhibits the printing apparatus from starting printing the first data, and makes the printing apparatus wait for input of the second data to be merged to the second folder. After the second data is input to the second folder (corresponding to the first type hot folder in the above control example), the control unit allows the printing apparatus 101 to print data prepared by merging the first and second data.

By implementing the above configuration by the first embodiment, the effect of improving the usability of the printing process using the hot folder can be further enhanced. This configuration can flexibly meet various needs from the user for processes using the hot folder.

The first embodiment will mainly explain a series of printing control operations using the hot folder with the user interface (including the operation unit 204 and display unit 205) of the computer 100, but the following configuration can also be employed.

For example, the printing apparatus 101 is a multi-functional image forming apparatus. This image forming apparatus comprises an operation unit including a touch panel type large-screen liquid crystal display unit, and a storage unit such as a hard disk capable of storing a plurality of document data (image data from a computer and image data from a scanner).

The CPU 301 of the printing apparatus 101 controls the display unit of the printing apparatus 101 so as to display a list of the icons of hot folders including the first and second type hot folders on the display unit of the printing apparatus 101, and also display a list of the icons of independent document data including the icon of the third document data (C1 and C2) formed from a 2-page document and the icon of the fourth document data (D1 and D2) formed from a 2-page document.

For example, the icon of the third document data is dragged and dropped (input) into the second type hot folder on the screen by user's touch panel operation on the liquid crystal display unit of the printing apparatus 101. In response to this, the CPU 301 directly reads out the third document data (C1 and C2) from the memory at the time without opening the file of the third document data on the screen. The CPU 301 controls the printer unit of the printing apparatus 101 to print under process conditions registered for the second type hot folder. In this example, the third document data of two pages is printed out page by page on A3-size print sheets, this process is repeated by five output copies, and the printed sheets are sorted by the finisher of the printing apparatus 101.

To the contrary, for example, when the icon of the third document data is dragged and dropped (input) into the first type hot folder on the screen by user's touch panel operation on the liquid crystal display unit of the printing apparatus 101, the CPU 301 inhibits the printer unit from printing the third document data at this time, and makes the printer unit wait until another document data to be merged to the third document data is input to the first type hot folder.

In this state, for example, the icon of the fourth document data is dragged and dropped (input) into the first type hot folder on the screen by user's touch panel operation on the liquid crystal display unit of the printing apparatus 101. In response to this, the CPU 301 creates, in the memory (e.g., the hard disk or RAM 302 of the printing apparatus 101), merged document data of a total of four pages by merging 2-page document data (e.g., page images C1 and C2) contained in the third document data and 2-page document data (e.g., D1 and D2) contained in the fourth document data in the same order as the order of inputting these document data to be merged to the first type hot folder (order of user's operation of dropping the icons of the documents to be merged into the hot folder icon) (in this case, merged document data in a page order of C1, C2, D1, and D2 is created). The CPU 301 controls the printer unit of the printing apparatus 101 to print the merged document data under process conditions registered for the first type hot folder. In this example, the document data of four pages merged in a page order of C1, C2, D1, and D2 is printed out page by page on A4-size print sheets, two output copies of the document data are created, and the printed sheets are stapled by the finisher of the printing apparatus 101.

With this configuration, the above-described effect can be further enhanced, and the system can be smoothly, flexibly configured.

The above configuration has specifications in consideration of user's merits, and is not always a necessary constituent feature.

<Process by Computer 100>

Figure 9:
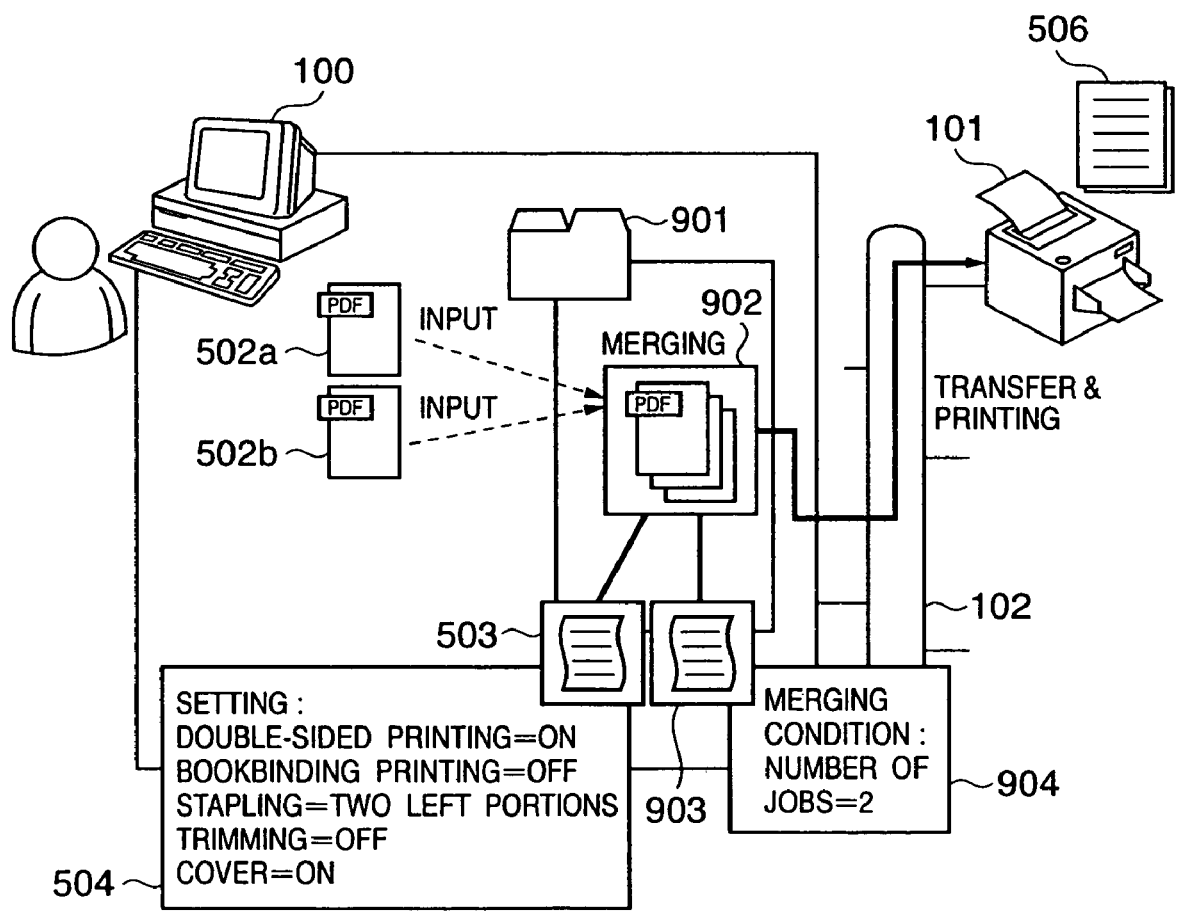
FIG. 9 is a schematic view showing the flow of a process which is performed by a CPU 201 when a file to be printed is input to the hot folder according to the first embodiment of the present invention.

FIG. 9 is a schematic view showing the flow of a process which is performed by the CPU 201 when a file to be printed is input to the hot folder according to the first embodiment.

In FIG. 9, reference numerals 502a and 502b denote files to be printed. Reference numeral 901 denotes a hot folder displayed on the display screen of the display unit 205. Reference numeral 902 denotes one file obtained by merging files to be printed that are stored in the hot folder. Reference numeral 904 denotes condition data which describes a condition to be satisfied to merge, into one file, files to be printed that are input to the hot folder 901.

When a file to be printed is input to the hot folder, the CPU 201 counts the number of input files to be printed, as described above. In this case, the files 502a and 502b to be printed are input in an order named. Every time one file to be printed is input, the CPU 201 refers to the condition data 904 and checks whether the number of input files to be printed is two. If so, i.e., the file 502b is input after the file 502a is input, the CPU 201 executes a merging program 903, and merges the files 502a and 502b into one file 902. The CPU 201 sends the generated file to the printer driver of the printing apparatus 101, and generates print data.

The CPU 201 executes a program 503, and performs a process of attaching, to the print data, set data 504 representing the print condition of the generated print data. The CPU 201 transfers the print data containing the set data 504 to the printing apparatus 101 via the network 102. The printing apparatus 101 performs a printing process in accordance with the transferred print data on the basis of the transferred set data, thereby obtaining a printed product 506. The contents of the file 502a are printed first in the printed product 506, and then those of the file 502b are printed.

The condition data 904 and set data 504 are created when the hot folder 901 is created, and are saved in the external storage device 206 as data on the hot folder 901. When a file to be printed is input to the hot folder 901, the CPU 201 reads out the set data 504 and condition data 904 onto the RAM 202, and uses them in the above-described manner.

When print data of a plurality of files to be printed are "separately" transferred to the printing apparatus, the computer generates print data for each file to be printed, and transfers the print data to the printing apparatus 101 in the generation order. However, assume that, when a plurality of computers are connected to the printing apparatus 101, print data of the first and second files have already been transferred from a given computer to the printing apparatus 101, and a long time is taken for generating print data of the third file because the print data of the third file is large in size. Before the print data of the third file arrives at the printing apparatus 101, print data transmitted from another computer may arrive. In this case, as printed products, the printing apparatus 101 outputs a printed product in which the contents of the first file are printed, a printed product in which the contents of the second file are printed, and a printed product in which the contents of the file from the latter computer are printed.

In the first embodiment, print data to be transmitted to the printing apparatus 101 is "print data of one file made up of a certain number of files". Hence, even if each computer transmits print data to the printing apparatus 101, print data transmitted from a given computer are not printed together with those transmitted from another computer, unlike the above example.

In FIG. 9, the condition described in the condition data 904 is "the number of input files to be printed is two.", but the condition is not limited to this and various conditions are conceivable. For example, in addition to the number of input files to be printed, "the type of file to be printed" (e.g., a text, a text created by a predetermined application, a bitmap image, or a JPEG image) may be designated. For example, when the condition described in the condition data 904 is "the number of input files to be printed is two, and the type of file to be printed is a text.", the CPU 201 performs a process of referring to the extension of an input file to be printed, permitting input of only files with ".txt" to the hot folder, counting the number of input files, and when the count is "2", merging the two input files in the input order.

The order of files to be merged is not limited to the input order, and may be defined by the condition data 904.

In any case, the CPU 201 permits input of only files which satisfy the condition described in the condition data 904 among files to be input to the hot folder by the operator. If the CPU 201 detects that input files satisfy the condition described in the condition data 904, the CPU 201 merges the input files, creates print data on the basis of the merged files, attaches set data, and transmits the resultant print data to the printing apparatus 101.

Figure 5:
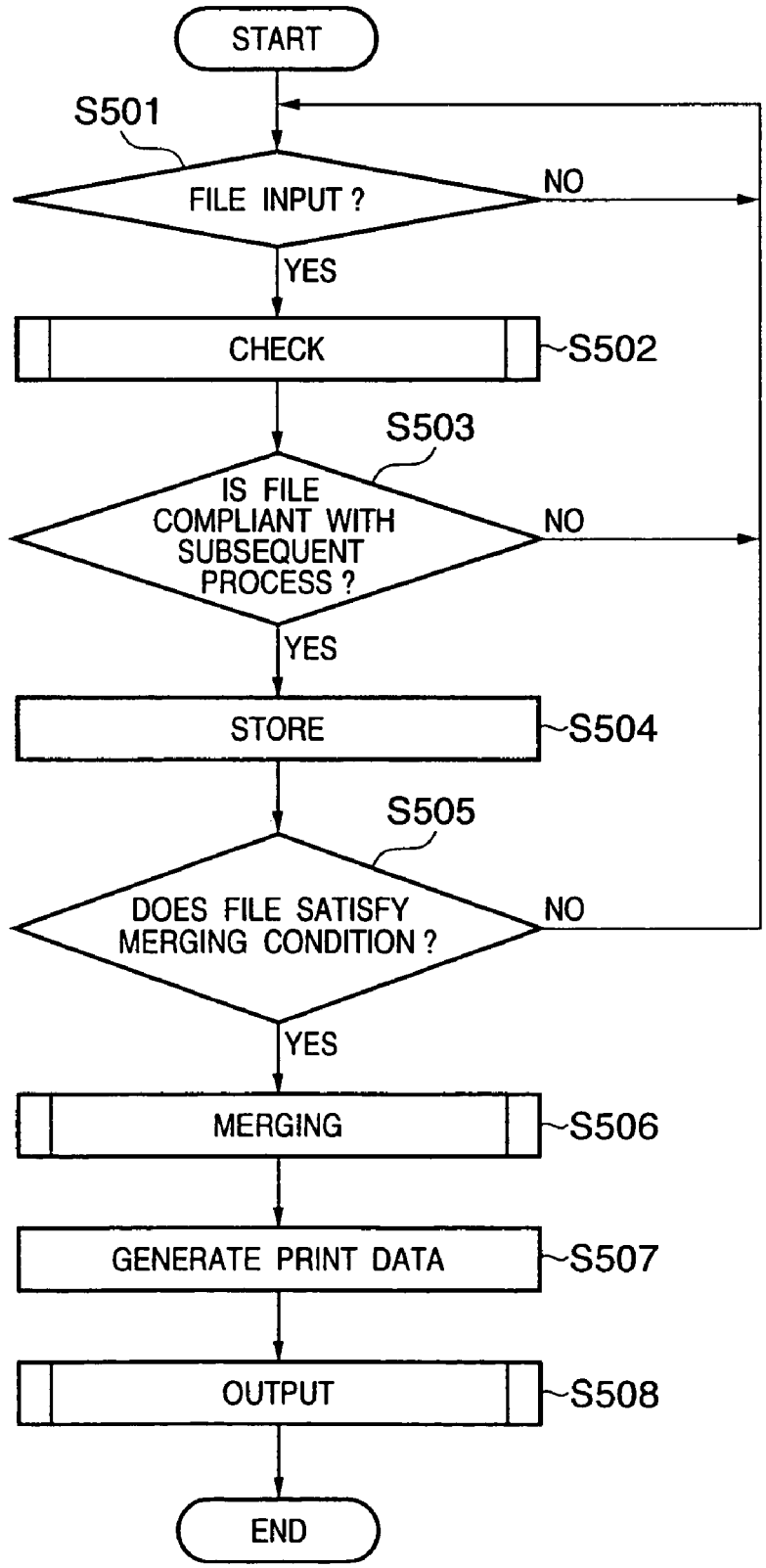
FIG. 5 is a flowchart showing a series of processes of merging files to be printed that are input to a hot folder, and transmitting the merged file to the printing apparatus 101.

FIG. 5 is a flowchart showing a series of processes of merging files to be printed that are input to the hot folder, and transmitting the merged file to the printing apparatus 101. A program and data for causing the CPU 201 to execute the processes complying with the flowchart of FIG. 5 are saved in the external storage device 206. The program and data are read out to the RAM 202 under the control of the CPU 201, the CPU 201 executes them, and the computer 100 executes processes to be described below.

If the CPU 201 detects that a file to be printed has been input to the hot folder by the operator (for example, detects that the display position of the file to be printed is moved by the mouse cursor close to the display position of the hot folder) (step S501), the CPU 201 checks the input file to be printed (step S502).

Figure 6:
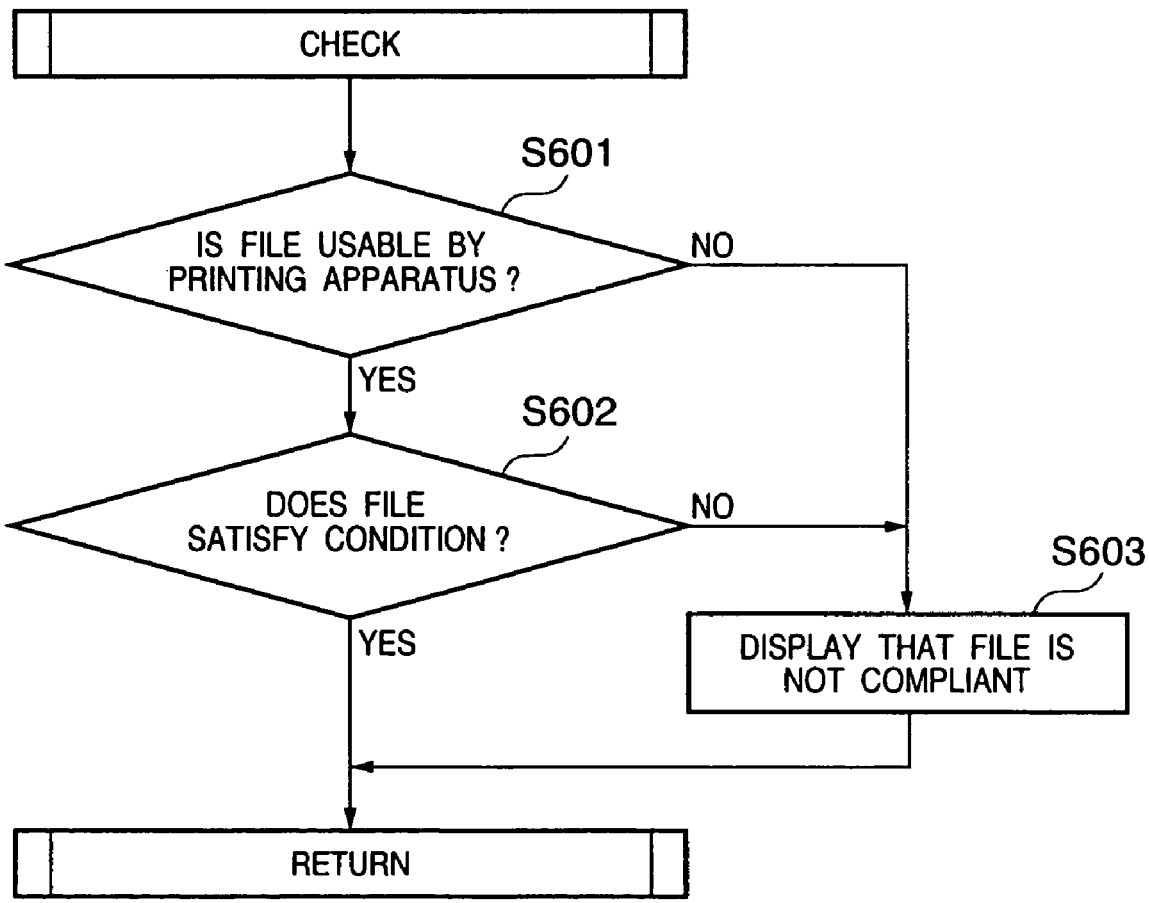
FIG. 6 is a flowchart showing details of the process in step S502.

FIG. 6 is a flowchart showing details of the process in step S502. In the check process, the CPU 201 checks whether the input file to be printed can be used by the printing apparatus 101 (step S601). This process is a known determination process, and a description thereof will be omitted.

If it is determined as a result of the check process that the input file to be printed can be used by the printing apparatus 101, the process advances to step S602 to check whether the input file to be printed satisfies a condition described in the condition data 904 (step S602). For example, when the condition data 904 designates "text", whether the input file to be printed is a text is checked on the basis of, e.g., the extension in step S602.

If it is determined as a result of the check process that the input file to be printed satisfies the condition described in the condition data 904, the input file to be printed is determined to be "a file to be printed that is compliant with a subsequent process", and the process advances to step S503 in FIG. 5.

If it is determined in step S601 that the input file to be printed cannot be used by the printing apparatus 101, or it is determined in step S602 that the input file to be printed does not satisfy the condition described in the condition data 904, a message that the input file to be printed is not compliant is displayed on the display screen of the ROM 203. The input file to be printed is determined not to be "a file to be printed that is compliant with a subsequent process", and the process advances to step S503 in FIG. 5.

Referring back to FIG. 5, if it is determined in step S503 as a result of the process complying with the flowchart of FIG. 6 that the input file to be printed is not "a file to be printed that is compliant with a subsequent process", the process returns to step S501 and waits for input of the next file to be printed.

If it is determined as a result of the process complying with the flowchart of FIG. 6 that the input file to be printed is "a file to be printed that is compliant with a subsequent process", the process advances to step S504. Since it can be determined that the input file to be printed can be input to the hot folder, the input file to be printed is stored in "an area (to be referred to as a hot folder area hereinafter) in the RAM 202 where the file to be printed that is input to the hot folder is stored" (step S504).

By referring to the condition data 904, it is determined whether each stored file to be printed satisfies the condition described in the condition data 904 (step S505). For example, when the condition data 904 describes a condition "the number of input files to be printed is two and the transmission time is 17:00", the CPU 201 first checks whether the number of files to be printed that have already been stored in the hot folder area is two, and then checks whether the current time counted by the internal timer of the CPU 201 is 17:00.

If the number of files to be printed that have already been stored in the hot folder area is two, and the current time counted by the internal timer of the CPU 201 is 17:00, it is determined that the condition is "satisfied", and the process advances to step S506 to merge the files stored in the hot folder area (step S506). The merging order may be the input order or an order defined in the condition data 904. For example, when the merging order defined by the condition data 904 is "text→JPEG image", files are merged in the order of text files and JPEG image files, instead of the file input order.

One merged file is supplied to the printer driver of the printing apparatus 101 that is loaded from the external storage device 206 into the RAM 202, and print data is generated (step S507). Upon reception of a transfer instruction from the printing apparatus 101, set data representing a print condition is attached to the print data generated in step S507, and the resultant print data is transferred to the printing apparatus 101 (step S508).

Figure 7:
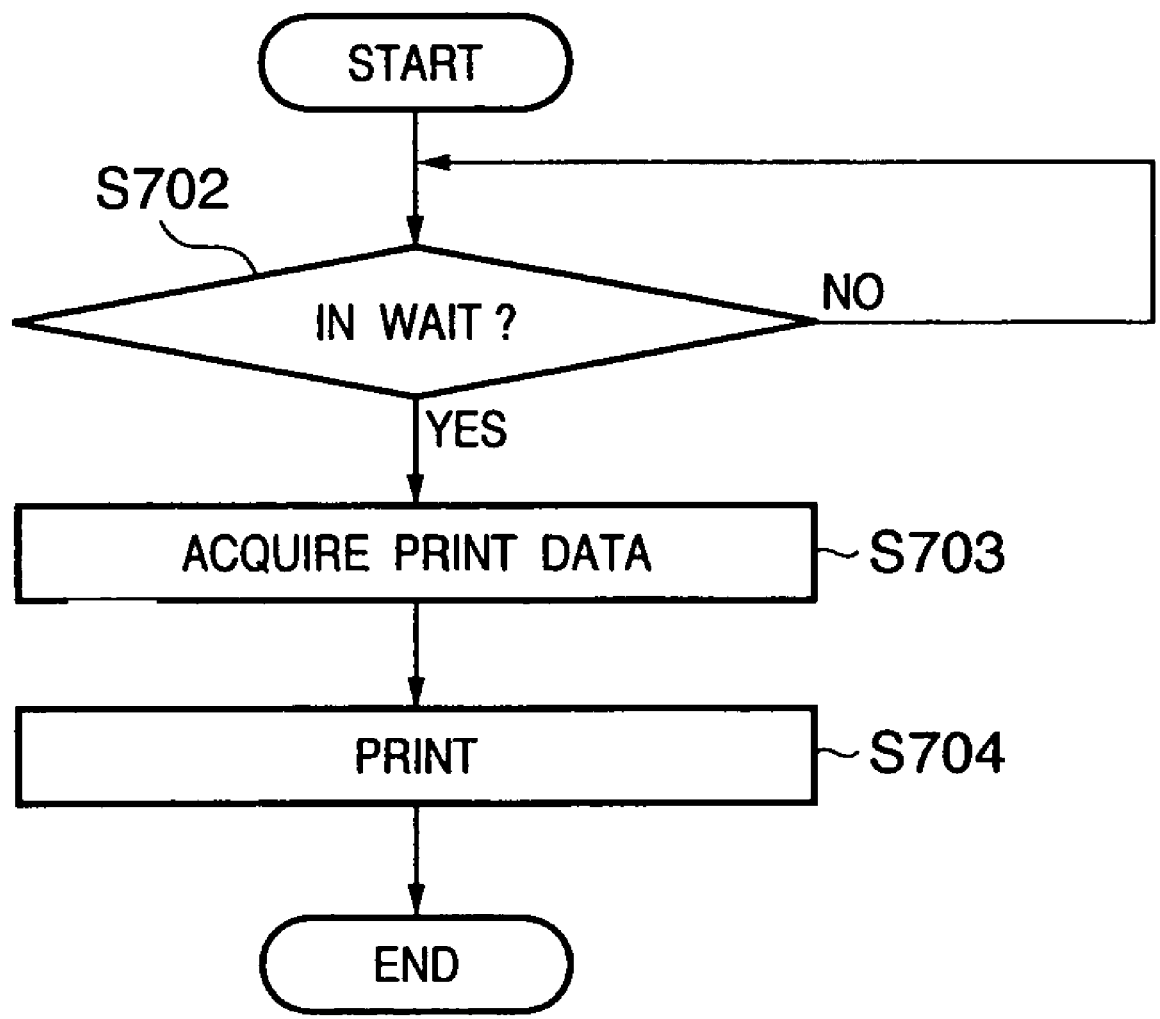
FIG. 7 is a flowchart showing a process performed by the printing apparatus 101 in printing.

FIG. 7 is a flowchart showing a process performed by the printing apparatus 101 in printing. A program and data for causing the CPU 301 to execute the processes complying with the flowchart of FIG. 7 are saved in the ROM 303. The CPU 301 executes the program and data, and the printing apparatus 101 executes processes to be described below.

When the computer 100 generates print data to which set data is attached, the computer 100 sets in the hot folder area a flag representing that the computer 100 is in wait at present. The CPU 301 of the printing apparatus 101 periodically accesses the hot folder area of the computer 100, refers to this flag, and checks whether the computer 100 is in wait at present (step S702).

If it is determined as a result of the check that the computer 100 is in wait, the process advances to step S703 to request the computer 100 to transmit print data. In response to this, the computer 100 transmits the print data containing the set data to the printing apparatus 101, and the CPU 301 receives the print data and stores it in the RAM 302 (step S703). Accordingly, the printing apparatus 101 can obtain the print data to which the set data is added.

The CPU 301 controls the image processing engine 304 and printer engine 305, and performs a printing process in accordance with the print data on the basis of the received set data (step S704).

By the above process, according to the first embodiment, a plurality of files to be printed can be input to the hot folder and transmitted as one merged job to the printing apparatus.

A printed product by the printing apparatus can be obtained for each of jobs transmitted from respective computers, and print data of one job is not printed together with print data of part of another job.

In the above description, only one hot folder is created. Since there are various merging conditions (conditions defined in the condition data 904), hot folders corresponding to the respective conditions may be created.

For example, a given hot folder is created as an "input port for files to be printed" for merging input files to be printed and outputting the merged file to the printing apparatus 101 when a condition "the number of input files to be printed is three, and the input order is text→JPEG image" is satisfied. Another hot folder is created as an "input port for files to be printed" for merging input files to be printed and outputting the merged file to the printing apparatus 101 when a condition "the number of input files to be printed is four, and the type of file to be printed that is permitted to be input is only a text" is satisfied. By creating hot folders corresponding to various conditions, the operator of the computer can properly use hot folders in accordance with various application purposes.

To create a plurality of hot folders, the contents of set data and condition data must be set for each hot folder. A set of the created set data and condition data is associated with a corresponding hot folder and saved in the external storage device 206.

When the operator executes an operation of inputting a file to be printed to a given hot folder, the CPU 301 reads out corresponding condition data to the RAM 202, refers to the readout condition, and performs a subsequent process in the above-described way.

Second Embodiment

In the second embodiment, as a process of merging files to be printed that are stored in the hot folder, files are merged by inserting a file to be printed into a file to be printed that is stored in the hot folder.

Figure 11:
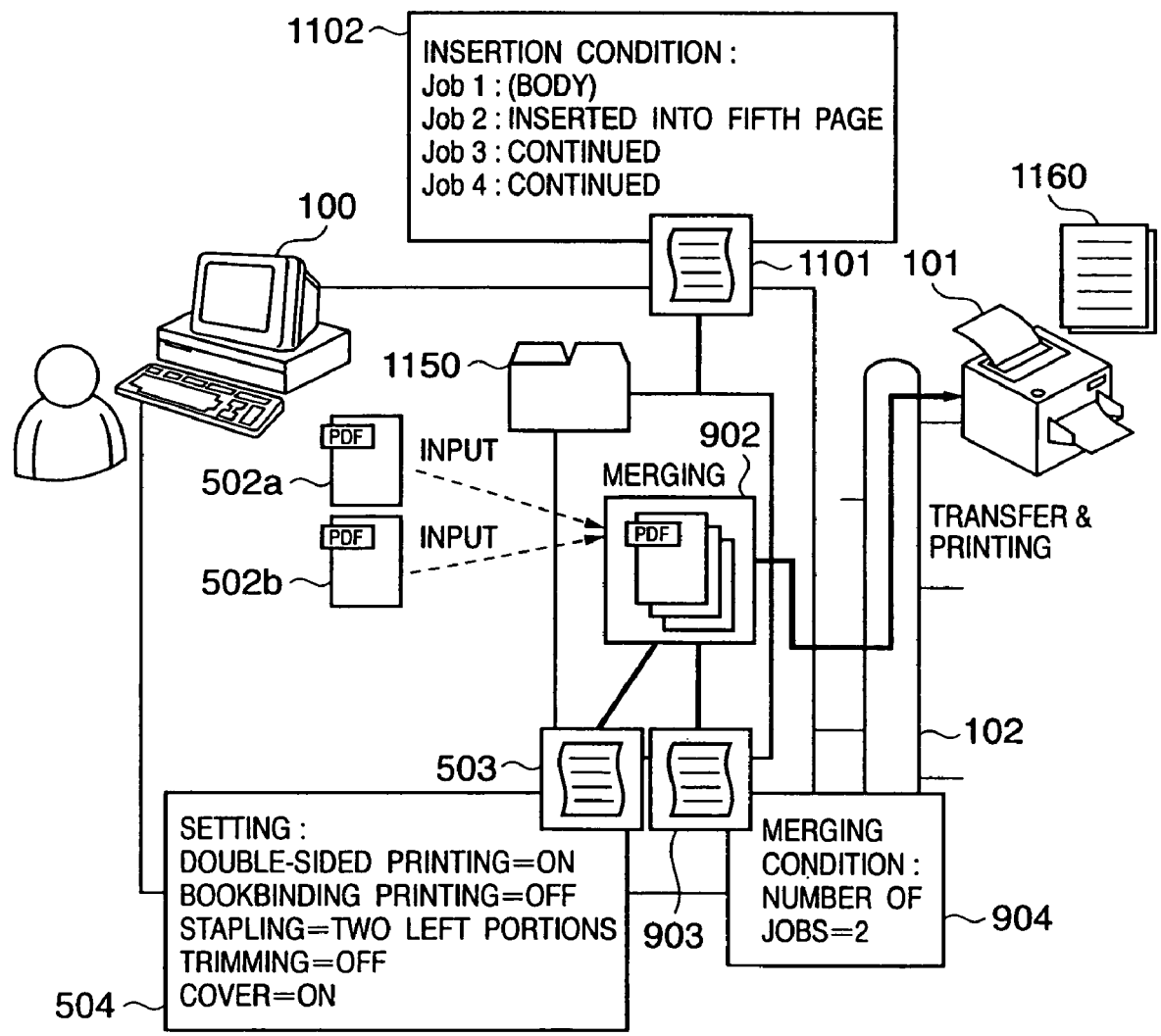
FIG. 11 is a schematic view showing the flow of a process which is performed by a CPU 201 when a file to be printed is input to the hot folder according to the second embodiment of the present invention.

FIG. 11 is a schematic view showing the flow of a process which is performed by a CPU 201 when a file to be printed is input to the hot folder according to the second embodiment. In FIG. 11, the same reference numerals as in FIG. 9 denote the same parts, and a description thereof will be omitted.

When a file to be printed is input to the hot folder, the CPU 201 counts the number of input files to be printed, similar to the first embodiment. In this case, files 502*a* and 502*b* to be printed are input in an order named. Every time one file to be printed is input, the CPU 201 refers to condition data 904 and checks whether the number of input files to be printed is two. If so, i.e., the file 502*b* is input after the file 502*a* is input, the CPU 201 executes a program 1101, and merges the files 502*a* and 502*b* into one file 902. In merging, according to the second embodiment, the CPU 201 executes the program 1101 by referring to insertion condition data 1102, and decides which file to be printed is to be inserted and into which file to be printed the file is inserted. The CPU 201 inserts the file to be printed into the decided destination. This process is performed for all files to be printed that are stored in the hot folder area. A process of attaching set data 504 to one generated file and transferring the file to a printing apparatus 101 is the same as that in the first embodiment.

In FIG. 11, the insertion condition data 1102 represents that the next input file (Job 2) to be printed is inserted into the fifth page of the first input file (Job 1) to be printed, the second next input file (Job 3) to be printed is inserted into the sixth page of the file (Job 1), and the third next input file (Job 4) to be printed is inserted into the seventh page of the file (Job 1).

In this manner, a file is inserted into another file to create one file. The contents of the inserted file are printed at the insertion position in the destination file in a printed product 1106 obtained by printing the file.

The condition data 904, set data 504, and insertion condition data 1102 are created when a hot folder 1150 is created, and are saved in an external storage device 206 as data on the hot folder 1150. When a file to be printed is input to the hot folder 1150, the CPU 201 reads out the set data 504, condition data 904, and insertion condition data 1102 onto a RAM 202, and uses them in the above-described manner.

The flowchart of a series of processes of merging files to be printed that are input to the hot folder, and transmitting the merged file to the printing apparatus 101 is attained by replacing the process in step S506 in the flowchart of FIG. 5 with a process to be described below.

Figure 12:
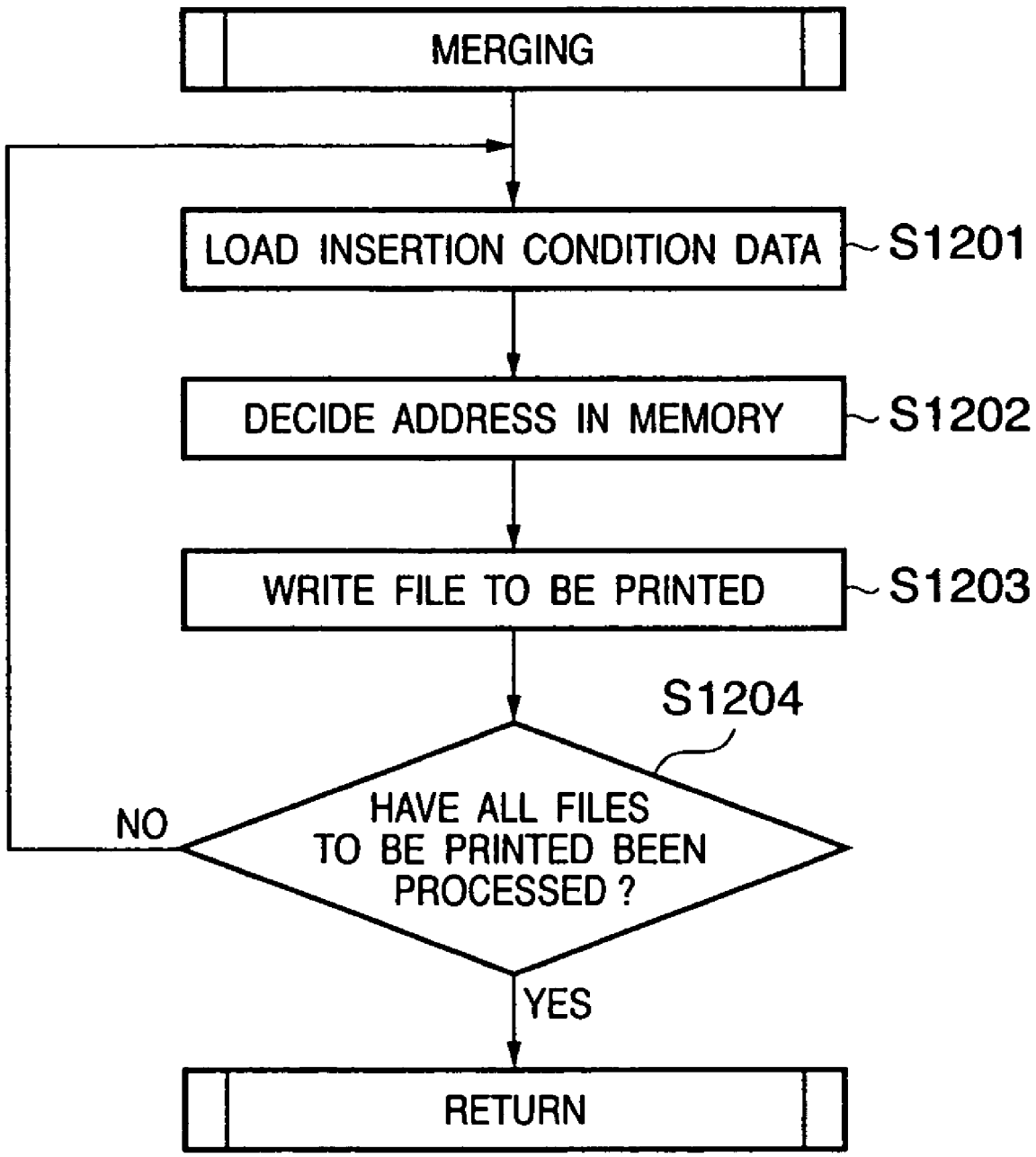
FIG. 12 is a flowchart showing details of the process in step S502 according to the second embodiment of the present invention.

FIG. 12 is a flowchart showing details of the process in step S506 according to the second embodiment.

The insertion condition data 1102 is referred to (step S1201), and it is decided which area in the RAM 202 is to store a file to be printed that is stored in the hot folder area (step S1202). The file to be printed is stored in the decided area (step S1203).

If the file to be printed is a body as a result of referring to the insertion condition data 1102, the file is stored in a predetermined area in the RAM 202.

If the process from step S1201 to step S1203 has not been performed for all files to be printed that are stored in the hot folder area, the process returns to step S1201 to execute the process from step S1201 for the next file to be printed.

If the next file to be printed is to be inserted into the fifth page of the body as a result of referring to the insertion condition data 1102 for the next file (step S1201), the address of the fifth page of the body is acquired (step S1202), and the file to be printed is stored at the acquired address (step S1203).

This process is done for all files to be printed that are stored in the hot folder area, and files to be printed that are defined in the insertion condition data 1102 are inserted at destinations in the body that are defined in the insertion condition data 1102. By inserting all target files to be printed into the body, all the files which are stored in the hot folder area can be merged, and the process returns to step S507.

Note that the insertion condition data 1102 may contain not only a page number serving as the destination of a given file to be printed, but also information representing a page in which the file is to be inserted and a position at which the file is to be inserted.

A process except the above-described process is the same as that in the first embodiment.

Third Embodiment

In the third embodiment, before set data is added to print data, information described in the set data is referred to, it is determined whether to change each set content described in the set data, and if so, a change window is displayed on the display screen of a display unit 205.

Figure 13:
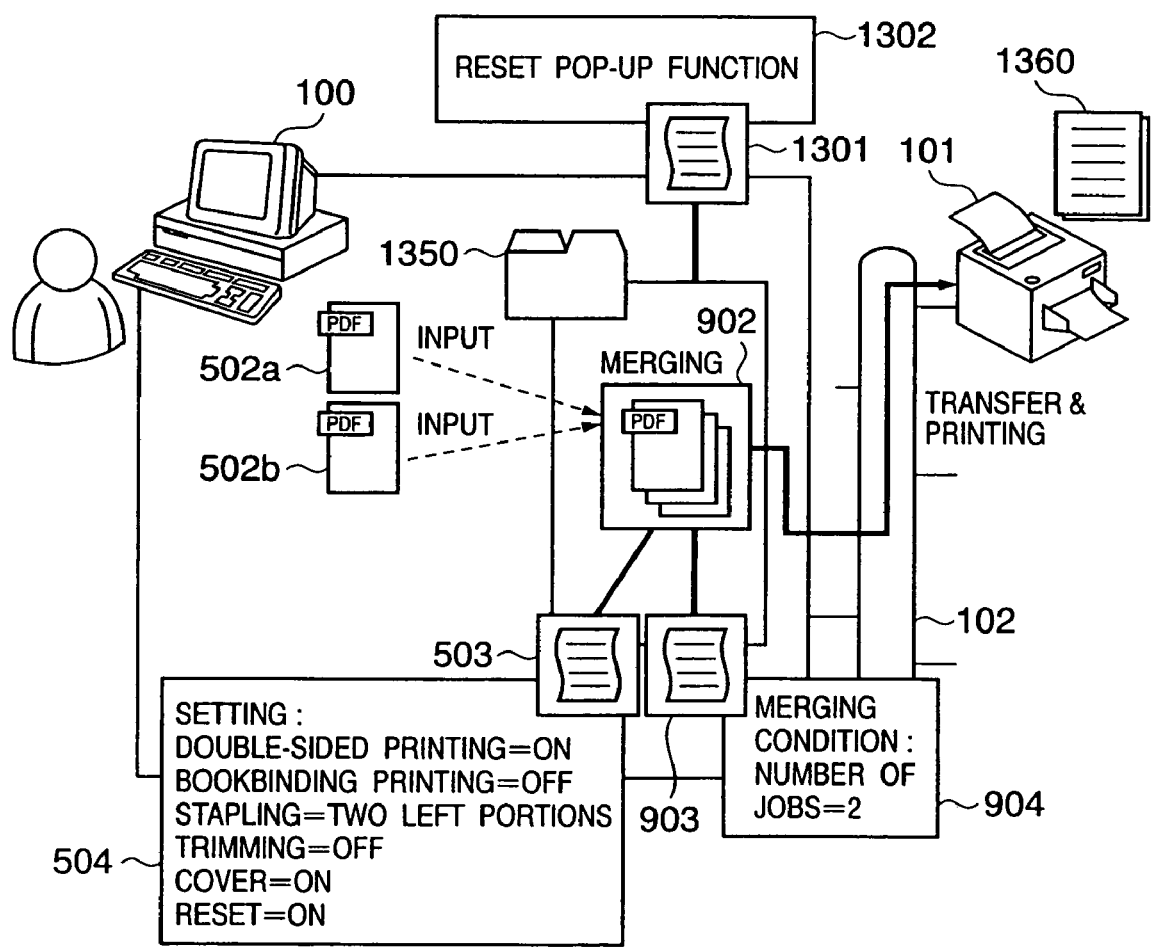
FIG. 13 is a schematic view showing the flow of a process which is performed by a CPU 201 when a file to be printed is input to the hot folder according to the third embodiment of the present invention.

FIG. 13 is a schematic view showing the flow of a process which is performed by a CPU 201 when a file to be printed is input to the hot folder according to the third embodiment. In FIG. 13, the same reference numerals as in FIG. 9 denote the same parts, and a description thereof will be omitted.

Set data 504 contains a reset flag, and the CPU 201 refers to the reset flag after print data is created. When the reset flag is ON, the CPU 201 executes a program 1301, and displays on the display screen of the display unit 205 a GUI (Graphical User Interface) for changing set contents described in the set data 504. If set contents to be changed exist, the operator operates an operation unit 204 to change the set contents. The changed contents are sequentially reflected on the set data 504.

When the CPU 201 detects that an instruction to close the GUI has been input, the CPU 201 adds the set data 504 to print data and sends the resultant print data to a printing apparatus 101, similar to the above embodiments.

The flowchart of a series of processes of merging files to be printed that are input to the hot folder, and transmitting the merged file to the printing apparatus 101 is attained by replacing the process in step S508 in the flowchart of FIG. 5 with a process to be described below.

Figure 14:
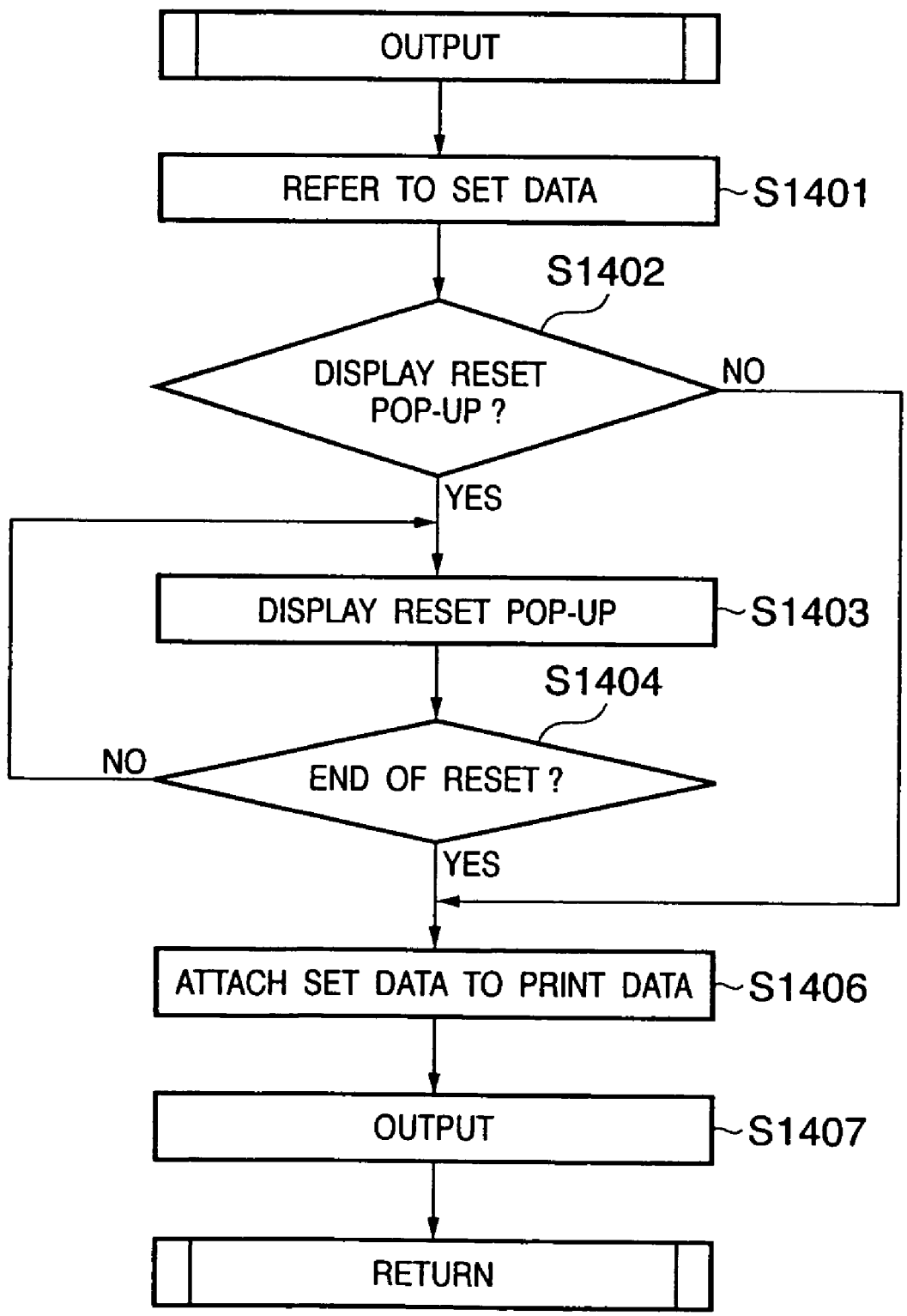
FIG. 14 is a flowchart showing details of the process in step S508 according to the third embodiment of the present invention.

FIG. 14 is a flowchart showing details of the process in step S508 according to the third embodiment.

The CPU 201 refers to set data (step S1401), and determines whether the reset flag is ON (whether to display the GUI) (step S1402). If the reset flag is OFF, the process advances to step S1406 to add the set data to print data (step S1406) and send the resultant print data to the printing apparatus 101 (step S1407), similar to the above embodiments.

If the reset flag is ON, the process advances to step S1403, and a GUI (reset pop-up) for changing set contents described in the set data is displayed on the display screen of the display unit 205 (step S1403). When the set contents are changed via the GUI, the set data is sequentially updated.

If the CPU 201 detects that an instruction to end the reset process using the GUI has been input via the operation unit 204 (step S1404), the process advances to step S1406 to add the set data to print data (step S1406) and send the resultant print data to the printing apparatus 101 (step S1407), similar to the above embodiments.

Fourth Embodiment

Figure 10:
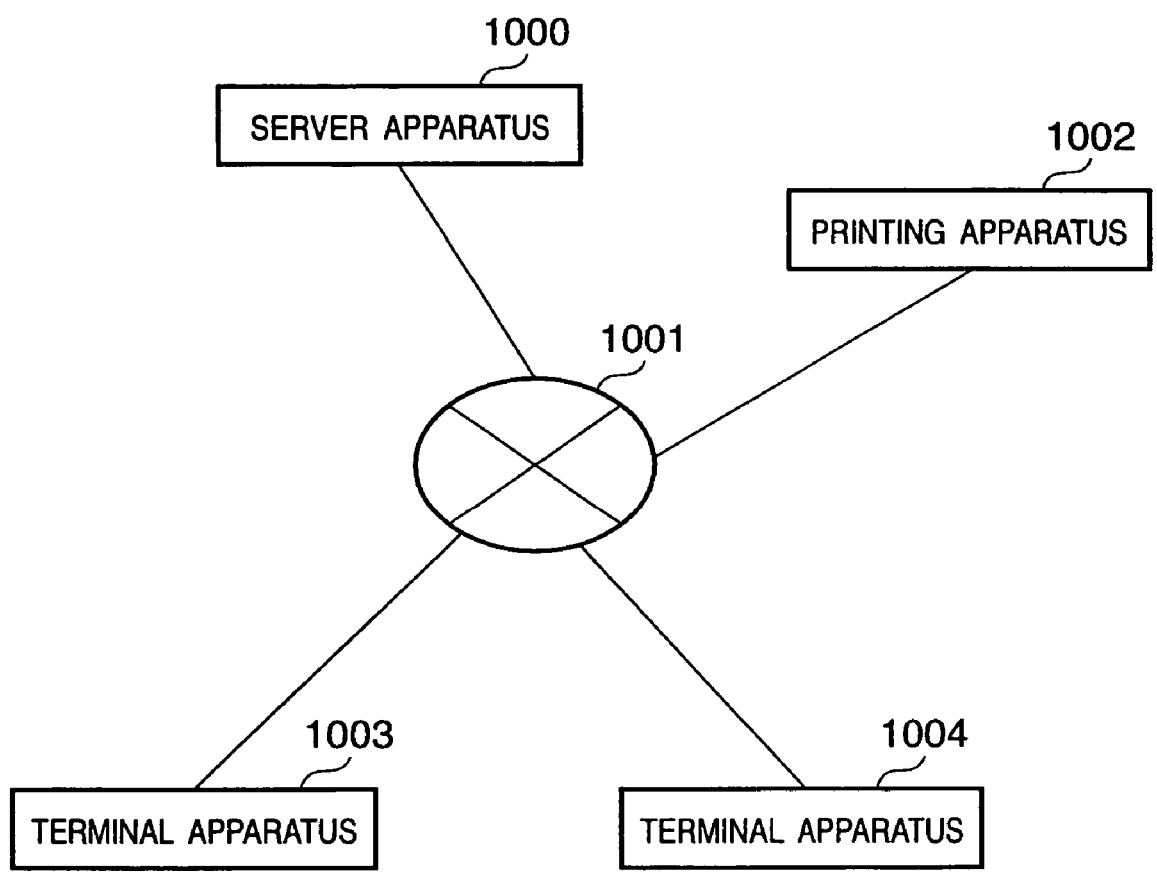
FIG. 10 is a view showing an example of a system configuration according to the fourth embodiment of the present invention.

As shown in FIG. 10, a system according to the fourth embodiment is comprised of one server apparatus 1000, one printing apparatus 1002, and two terminal apparatuses 1003 and 1004. These apparatuses are connected via a network 1001 so that they can communicate data with each other. The basic configurations of the server apparatus 1000 and the terminal apparatuses 1003 and 1004 are the same as that of the computer 100 in the above embodiments.

FIG. 10 is a view showing an example of a system configuration according to the fifth embodiment.

In the fifth embodiment, the hot folder is created in the server apparatus 1000, and displayed on the display screens of display units 205 of the terminal apparatuses 1003 and 1004.

The operators of the terminal apparatuses 1003 and 1004 can input print jobs to the hot folder managed by the server apparatus 1000. The server apparatus 1000 merges, e.g., files to be printed that are received from the terminal apparatuses 1003 and 1004, and sends the merged file to the printing apparatus 1002, similar to the first embodiment.

This system can be applied when, for example, employees of a company are asked to fill in a questionnaire and the results of the questionnaire are merged and printed. In this case, the employees are given the terminal apparatuses 1003 and 1004. When the computer 100 receives files to be printed (text files as the results of the questionnaire) from all employees (information on "the number of input files to be printed is the number of all employees" is contained in condition data), a result of merging the files from the employees can be obtained. The merged result is sent to the printing apparatus 1002 to print the contents of the files of the employees at once.

The server apparatus 1000 can specify, from an IP address or the like, which terminal apparatus has transmitted a received file to be printed. The server apparatus 1000 can also register information representing the correspondence between an employee and his IP address. Files to be printed that are merged can be limited by various filters such that only files to be printed that are transmitted from predetermined employees are merged.

An application example of this system is not limited to the above one, and the system is not limited to the configuration in FIG. 10.

Fifth Embodiment

The system according to each of the first to third embodiments is formed from one computer and one printing apparatus. That is, the destination to which print data is transmitted from one computer is one printing apparatus.

However, the system may be comprised of one computer and a plurality of printing apparatuses. In this case, the operator of the computer selects a printing apparatus serving as the output destination of print data from a plurality of printing apparatuses, and creates a hot folder for the selected printing apparatus in the above-described way. The operator may also create a plurality of hot folders for one printing apparatus in the above-described fashion.

By this process, when the operator of the computer wants to transmit print data to a desired printing apparatus, he only inputs a file to be printed to a hot folder corresponding to the desired printing apparatus. When a plurality of hot folders are created for a desired printing apparatus, the operator selects one of the hot folders in accordance with an application purpose, and inputs a file to be printed into the selected hot folder.

The above embodiments may be properly combined.

Other Embodiment

The object of the present invention is also achieved when a recording medium (or storage medium) which records software program codes for realizing the functions of the above-described embodiments is supplied to a camera, and the CPU or MPU of the camera reads out and executes the program codes stored in the recording medium. In this case, the program codes read out from the recording medium realize the functions of the above-described embodiments, and the recording medium which records the program codes constitutes the present invention.

The functions of the above-described embodiments are realized when the camera executes the readout program codes. Also, the functions of the above-described embodiments are realized when an OS (Operating System) or the like running on the camera performs some or all of actual processes on the basis of the instructions of the program codes.

Furthermore, the present invention includes a case in which, after the program codes read out from the storage medium are written in the memory of a function expansion card inserted into the camera or the memory of a function expansion unit connected to the camera, the CPU of the function expansion card or function expansion unit performs some or all of actual processes on the basis of the instructions of the program codes and thereby realizes the functions of the above-described embodiments.

When the present invention is applied to the recording medium, the recording medium records program codes corresponding to the above-described flowcharts (functional configurations).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-235554 filed Aug. 12, 2004, which is hereby incorporated by reference herein.

What is claimed is:

1. An information processing apparatus comprising:
a setting unit configured to set a print configuration to a folder in accordance with a user instruction;
a detection unit configured to detect an operation of inputting a file into the folder;
a management unit configured to manage the file, when the operation is detected by said detection unit;
a determination unit configured to determine whether each of a plurality of files managed by said management unit has a predetermined type and is inputted into the folder in a predetermined order defined by the predetermined type;
a generation unit configured to, in a case where said determination unit determines that each of the managed files has the predetermined type and is inputted into the folder in the predetermined order, merge the managed files in the predetermined order to generate print data to be outputted to a print device for printing according to the print configuration; and
a transmission unit configured to transmit the generated print data to the print device.

2. The apparatus according to claim 1, wherein a file having the predetermined type includes at least one of a text file and an image file.

3. The apparatus according to claim 1, wherein the print configuration is a staple configuration, and
said generation unit generates the print data used for causing the print device to staple the merged files.

4. An information processing method comprising:
using a computer to set a print configuration to a folder in accordance with a user instruction;
detecting an operation of inputting a file into the folder;
managing the file, when the operation is detected in said detecting step;
determining whether each of a plurality of files managed in said managing step has a predetermined type and is inputted into the folder in a predetermined order defined by the predetermined type;
in a case where it is determined in said determining step that each of the managed files has the predetermined type and is inputted into the folder in the predetermined order, merging the managed files in the predetermined order to generate print data to be outputted to a print device for printing according to the print configuration; and
transmitting the generated print data to the print device.

5. The method according to claim 4, wherein a file having the predetermined type includes at least one of a text file and an image file.

6. The method according to claim 4, wherein the print configuration is a staple configuration, and
in said merging step, the print data used for causing the print device to staple the merged files is generated.

7. A computer-executable program stored on a computer-readable storage medium, said computer-executable program being executable by a computer so as to control the computer to execute an information processing method, said information processing method comprising:
controlling the computer to set a print configuration to a folder in accordance with a user instruction;
detecting an operation of inputting a file into the folder;
managing the file, when the operation is detected in said detecting step;
determining whether each of a plurality of files managed in said managing step has a predetermined type and is inputted into the folder in a predetermined order defined by the predetermined type;
in a case where it is determined in said determining step that each of the managed files has the predetermined type and is inputted into the folder in the predetermined order, merging the managed files in the predetermined order to generate print data to be outputted to a print device for printing according to the print configuration; and
transmitting the generated print data to the print device.

8. A computer-readable storage medium storing a computer-executable program, said computer-executable program being executable by a computer so as to control the computer to execute an information processing method, said information processing method comprising:
controlling the computer to set a print configuration to a folder in accordance with a user instruction;
detecting an operation of inputting a file into the folder;

managing the file, when the operation is detected in said detecting step;

determining whether each of a plurality of files managed in said managing step has a predetermined type and is inputted into the folder in a predetermined order defined by the predetermined type;

in a case where it is determined in said determining step that each of the managed files has the predetermined type and is inputted into the folder in the predetermined order, merging the managed files in the predetermined order to generate print data to be outputted to a print device for printing according to the print configuration; and transmitting the generated print data to the print device.

* * * * *